UNITED STATES PATENT OFFICE.

ASA W. WILKINSON, OF NEW YORK, N. Y.

IMPROVEMENT IN MANUFACTURING ILLUMINATING-GAS.

Specification forming part of Letters Patent No. 140,104, dated June 17, 1873; application filed December 11, 1872.

*To all whom it may concern:*

Be it known that I, ASA W. WILKINSON, of the city, county, and State of New York, have invented a new and useful Improvement in Manufacturing Illuminating-Gas; and I do hereby declare the following to be a full, clear, and exact description thereof, which will enable those skilled in the art to make and use the same.

This invention relates to a process of manufacturing a rich and superior illuminating-gas, by first producing ordinary illuminating-gas from bituminous coal; or taking the natural light carbureted-hydrogen gas, escaping in some places from the earth; then purifying the same by the usual process; and finally passing the purified gas through a retort or retorts kept at or near a cherry-red heat, into which a rich hydrocarbon, such as petroleum, naphtha, oils, resin, &c., is introduced.

For the purpose of carrying out my invention, I produce coal-gas in the usual way of distilling bituminous coal, preference being had for those coals that are known to produce the greatest amount of gas without regard to its illuminating quality. The gas thus produced is purified in the usual way. The purified gas is then passed through a retort or retorts heated to or near a cherry-red heat, into which a quantity of rich hydrocarbons, such as petroleum, naphtha, oils, resin, &c., or the oil and tar resulting from the distillation of coal, is being introduced, care being taken that no more is introduced than sufficient to carburet the gas to the required standard.

By this process I have succeeded in producing a superior illuminating-gas without the production of waste products, the coal-gas at this high temperature being able to combine with and carry off the excess of carbon that these rich hydrocarbons are known to possess.

The gas requires no purification after having left the last retorts, and is now ready for the holder, thus avoiding the loss in illumination that rich gas suffers in passing through the purifiers.

I am aware that gas produced from bituminous coal has been passed through vessels containing hydrocarbon vapors, but this process has either been carried out by passing the gas, previous to its purification, through a heated retort containing the rich hydrocarbon, or the gas when purified is simply passed through a vessel containing hydrocarbon liquids in a cold, or comparatively cold, state. In the former case the illuminating-gas, after having been enriched by the hydrocarbon vapors, has to be passed through purifiers, and a large percentage of its illuminating-power is lost. In the latter case the hydrocarbon vapors do not enter into a permanent compound with the illuminating-gas, and they are liable to condense in the service-pipes.

By my process a pure, rich, and permanent illuminating-gas is produced, and the cost of the gas thus produced is materially reduced, since the poor gas obtained from the last distillation of coal (if said distillation is carried on for many hours) is converted into a rich illuminating-gas.

For example: The first hour the products of distillation of bituminous coal are oil, tar, and rich hydrocarbon gases; the second and third hours, rich illuminating-gas; the fourth hour the gas becomes poor in illumination; and, if the process be continued longer, then the gas will nearly have lost all its power of illumination, and in fact be almost pure hydrogen, yet in quantity quite considerable. Coal that would only give six thousand or seven thousand feet of good illuminating-gas can be made to give ten thousand to fifteen thousand feet of these poor gases, which by my process can be enriched to any standard required.

Instead of first preparing gas from bituminous coal, I can also use the light carbureted hydrogen that escapes from the earth in some places. If this gas is first purified, and then passed through a red-hot retort containing the rich hydrocarbon, the desired result is attained.

The volume of the gas can be still further increased by passing steam through the coke, which results from the previous process, whereby a water-gas is produced, which can be converted into illuminating-gas by passing it through red-hot retorts, as above stated.

What I claim as new, and desire to secure by Letters Patent, is—

A process of manufacturing a rich and superior illuminating-gas by first producing ordinary illuminating-gas from bituminous coal, or taking the natural light carbureted-hydrogen gas, escaping in some places from the earth, then purifying the same by the usual process, and finally passing the purified gas through a retort or retorts kept at or near a cherry-red heat, into which a rich hydrocarbon, such as petroleum, naphtha, oils, resin, &c., is introduced, substantially in the manner herein set forth.

A. W. WILKINSON.

Witnesses:
W. HAUFF,
E. F. KASTENHUBER.